May 12, 1970 C. GÖTZE 3,511,144
PHOTOGRAPHIC CAMERA WITH ILLUMINATING ARRANGEMENT
Filed Feb. 8, 1968 2 Sheets-Sheet 1

INVENTOR.

CHRISTIAN GÖTZE

BY Michael S. Striker
Attorney

United States Patent Office 3,511,144
Patented May 12, 1970

---

3,511,144
PHOTOGRAPHIC CAMERA WITH ILLUMINATING ARRANGEMENT
Christian Götze, Munich, Germany, assignor to Agfa-Gevaert Aktiengesellschaft, Leverkusen, Germany
Filed Feb. 8, 1968, Ser. No. 704,009
Claims priority, application Germany, Feb. 16, 1967,
A 54,927
Int. Cl. G03b 7/16, 9/02
U.S. Cl. 95—10   20 Claims

---

ABSTRACT OF THE DISCLOSURE

A photographic camera wherein the exposure time and the aperture size are adjusted by the components of a quadric crank chain. A first component controls the aperture size and is movable by the scanner for the needle of an exposure meter which is in circuit with a photoelectric cell when the camera is set for operation in daylight. The first component adjusts the position of a second component which controls the exposure time by adjusting a delay mechanism of the shutter. A third component of the crank chain determines the initial position of the second component in response to attachment of a multiple flash bulb holder to thus select the exposure time for operation in artificial light.

The focussing means of the camera can determine the aperture size when the camera is set for operation in artificial light, either by adjusting the resistance of a variable resistor which is connected in circuit with the exposure meter as a substitute for the photoelectric cell when the multiple flash bulb holder is attached to the camera, or by limiting the extent of adjustment of the first component by way of an arresting lever which can stop the second component. The first component is pivotally connected with the second component, and the second component is coupled with the third component by means of a pin-and-slot connection.

---

BACKGROUND OF THE INVENTION

The present invention relates to photographic cameras for operation in daylight and artificial light, and more particularly to improvements in cameras wherein the aperture size and the exposure time are adjustable as a function of scene brightness when the camera is used to make exposures in daylight. Still more particularly, the invention relates to improvements in cameras wherein one of the exposure values is selected as a function of the distance from th subject or scene when the user wishes to make exposures in artificial light.

SUMMARY OF THE INVENTION

It is an object of my invention to provide a camera with automatic exposure meter which adjusts the shutter and the diaphragm as a function of scene brightness for exposures in daylight and to equip the camera with a fully or partially built-in illuminating arrangement which can select the exposure values as a function of the guide number or as a function of another parameter of the illuminating arrangement when the camera is set for operation with artificial illumination of the subject.

Another object of the invention is to provide a simple and inexpensive photographic camera which can make exposures in daylight as a function of scene brightness and which can be reset for operation with artificial illumination of the subject to thereby provide exposure times which are best suited for operation with the particular illuminating arrangement.

A further object of my invention is to provide a novel operative connection between the illuminating arrangement of a photographic camera and the parts which select the exposure values.

Still another object of the invention is to provide a photographic camera which comprises a relatively small number of resilient elements, which can be reset from operation in daylight to operation in artificial light with a minimum of effort, which can automatically select the exposure time and the aperture size for operation in daylight, and which can automatically select the exposure time and the aperture size for operation in artificial light.

An additional object of the invention is to provide a camera which is constructed and assembled in such a way that the user need not understand the influence of exposure values on the quality of exposures but is still capable of making satisfactory exposures in daylight or in artificial light.

The improved camera comprises an adjustable shutter mechanism, an adjustable diaphragm mechanism, a crank chain (preferably a quadric chain) including interconnected movable first, second and third components respectively arranged to adjust the diaphragm mechanism, to adjust the shutter mechanism, and to determine the initial position of the second component, an exposure meter assembly including photoelectric means for moving the first and second components as a function of scene brightness when the camera is set for operation in daylight, an illuminating arrangement including resetting means movable between idle and operative positions in which the camera is respectively set for operation in daylight and artificial light, and a motion transmitting connection between the resetting means and the crank chain to adjust the shutter mechanism by way of the second and third components of the crank chain in response to movement of resetting means to operative position.

When the resetting means is in operative position, the exposure time can be selected as a function of the distance from the subject. This can be achieved by providing an arresting device for the second component of the crank chain to stop the second component in a position which is a function of the distance from the subject, or by providing a variable resistor whose resistance is adjustable as a function of the distance from the subject and which is connected in circuit with the moving coil instrument of the exposure meter assembly as a substitute for the photoelectric means when the camera is set for operation in artificial light.

For example, the resetting means may comprise a rod which is reciprocable in the housing of the camera and is moved from idle to operative position in response to attachment of a multiple flash bulb holder to an indexible socket in the housing.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
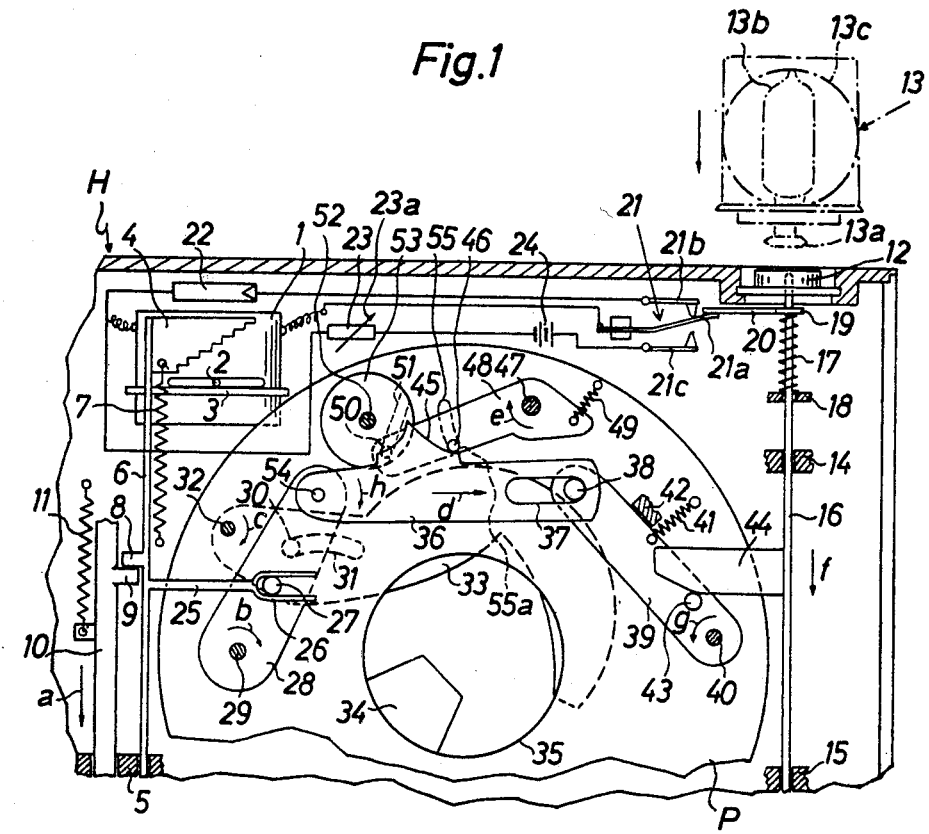
FIG. 1 is a fragmentary vertical sectional view of a camera with built-in illuminating arrangement which embodies one form of my invention.

The camera of FIG. 1 comprises a housing H which accommodates a photosensitive exposure meter assembly 1–4, 6–7, 21–22, 25–26 including a moving coil instrument 1 having an output member or needle 2 movable along a stationary back support or stop 3. The position of the needle 2 with reference to the stop 3 is a function of scene brightness, and such position can be detected by a stepped sensing member or scanner 4 mounted at one end of a reciprocable rod-like motion transmitting member or carrier 6 guided in a stationary bearing 5. The carrier 6 is biased downwardly, as viewed in FIG. 1, by a helical spring 7 which operates between the scanner 4 and the housing H and tends to move the stepped edge face of the scanner against the needle 2. The carrier 6 is provided with a projection or lug 8 which is biased against a similar projection or lug 9 provided on a reciprocable shutter release 10 guided in the bearing 5 and biased upwardly by a relatively strong return spring 11 which can overcome the bias of the spring 7 and normally maintains the scanner 4 in the illustrated starting position. One end of the return spring 11 is attached to the housing H and the upper end portion (not shown) of the shutter release 10 extends through the top wall of the housing so that it can be depressed by a finger in order to initiate an exposure.

The camera of FIG. 1 is further provided with a built-in illuminating arrangement here shown as a flash unit which utilizes multiple flash bulb holders 13 of the type known as "Flashcubes." One such multiple flash bulb holder is shown in FIG. 1 by phantom lines; it comprises a base provided with a male element or plug 13a which can be attached to an indexible socket 12 in the top wall of the camera housing H and four bulbs 13b each of which is located in front of a reflector 13c. The socket 12 forms part of the built-in flash unit and is preferably indexible by 90 degrees or by a multiple of 90 degrees in response to actuation of the film transporting mechanism or in response to actuation of the shutter release 10 so as to place a fresh flash bulb 13b into an optimum position for illumination of the subject or scene subsequent to completion of an exposure. The means for indexing the socket 12 are known from the art and therefore are not shown in FIG. 1. The plug 13a can be inserted into a recess of the socket 12 so that it rotates with the socket when the latter is caused to change its angular position. Such recess accommodates the upper end portion of a resetting rod 16 which is reciprocable in bearings 14, 15 and 18 and is biased upwardly by a prestressed spring 17. The resetting rod 16 has a collar or flange 19 and the spring 17 operates between the uppermost bearing 18 and collar 19 to bias the upper end portion of the rod into the recess of the socket 12, i.e., into the path of the plug 13a. When the plug 13a is properly coupled to the socket 12, the rod 16 is displaced from its idle position by moving in downward direction (arrow f) and causes the spring 17 to store additional energy. It is clear that the resetting rod 16 can be installed in the path of the foot on the casing of a detachable part of an illuminating arrangement which is connectable to a customary accessory shoe on the top wall of the housing H. In such a camera, the upper end portion of the resetting rod 16 extends into the accessory shoe or into the path of another element of the detachable part of the illuminating arrangement to be displaced downwardly, for example, to thereby adjust the exposure controls as a function of the guide member of the illuminating arrangement. The downward displacement of the rod 16 to operative position in the direction indicated by arrow f is then a function of the guide number of the illuminating arrangement. This rod 16 forms part of the illuminating arrangement and serves as a means for setting the camera for operation in daylight (idle position) or artificial light (operative position).

The collar 19 or another portion of the resetting rod 16 is provided with an extension or trip 20 which can displace the centrally located movable contact 21a of a two-way electric control switch 21. When the contact 21a engages a first fixed contact 21b of the control switch 21, the instrument 1 is connected in circuit with a photoelectric cell 22 which is exposed to scene light. However, when the rod 16 is moved downwardly to operative position in response to attachment of the plug 13a to the socket 12, the trip 20 moves the contact 21a into engagement with a second fixed contact 21c of the control switch 21 whereby the latter connects the exposure meter 1 in circuit with a battery 24 or an analogous source of electrical energy and with a variable resistor 23. The adjustable element or slider 23a of the variable resistor 23 is coupled with the focussing means of the camera in a well known manner so that the resistance of the resistor 23 is a function of the distance from the subject or scene. More accurately stated, the resistance of the resistor 23 is a function of the setting of the focussing means.

The photoelectric cell 22 can be replaced by a photoelectric resistor and a battery, or the control switch 21 can be employed to connect the battery 24 in circuit with the variable resistor 23 or with a photoelectric resistor which replaces the cell 22.

The carrier 6 for the scanner 4 is provided with an extension or arm 25 having a bifurcated end portion 26 which straddles a pin or post 27 provided on a diaphragm adjusting lever 28. The latter is turnable on a fixed pivot pin 29 and carries a second post 30 which extends into an arcuate slot 31 provided in an adjustable diaphragm blade or vane 33 which is pivotable on a fixed pivot pin 32. A stationary diaphragm blade or vane 34 cooperates with the vane 33 to define therewith a range of apertures whose size is a function of scene brightness when the control switch 21 connects the instrument 1 in circuit with the photoelectric cell 22, i.e., when the rod 16 is in inoperative position and sets the camera for operation in daylight. The numeral 35 denotes an objective lens which admits light rays in the direction toward the aperture defined by the vanes 33, 34. It is clear that the lever 28 can be used with equal advantage to adjust a more sophisticated diaphragm, for example, a diaphragm having two or more movable vanes. The pin-and-slot connection 30, 31 between the lever 28 and vane 33 can be replaced by a cam-and-follower connection.

A pin 54 on the lever 28 is connected with one end of a shutter adjusting link 36. The other end of the link 36 is provided with an elongated slot 37 for a pivot pin 38 provided on one end of a lever 39 which serves to adjust the initial position of the link 36 in response to movement of resetting rod 16 from operative to idle position or vice versa. The other end of the lever 39 is pivotable on a fixed pin 40 and this lever carries a motion receiving post or stud 43 extending into the path of movement of a motion transmitting arm or extension 44 on the resetting rod 16. A helical spring 41 operates between the lever 39 and a stationary plate P in the housing H and biases the post 43 against the arm 44. When the resetting rod 16 is allowed to assume its idle position under the action of spring 17, the lever 39 abuts against a stationary stop 42 and assumes a first end position. This indicates that the multiple flash bulb holder 13 is disconnected from the socket 12, i.e., that the camera is set for operation in daylight. The levers 28, 39 form with the link 36 a kinematic crank chain with three links and four pivots 29, 54, 38, 40. If the plate P which carries the pivots 29, 40 is counted as a fourth link, the parts P, 28, 36, 39 can be said to form a simple quadric crank chain with two swingable components 28, 39 coupled to each other by the components 36 and P.

The link 36 is provided with a substantially centrally located cam 45 tracked by a pin-shaped follower 46 provided on a lever 48 which is turnable on a fixed pivot pin 47. A spring 49 biases the follower 46 against the face of the cam 45 by tending to turn the lever 48 in a counterclockwise direction, as viewed in FIG. 1. The lever 48 is provided with a post 50 which extends into a guide groove 51 machined into a flywheel or mass 53 which is rotatable on a shaft 52. The parts 46–52 constitute a delay or retard mechanism of a shutter the remainder of which is not shown because its construction is well known from the art of cameras.

The operation is as follows:

FIG. 1 illustrates the camera in a condition ready for exposures in daylight. In order to make an exposure, the operator depresses the shutter release 10 in the direction indicated by arrow $a$ whereby the spring 11 stores energy and the spring 7 causes the lug 8 to follow the lug 9 so that the scanner 4 of the exposure meter assembly moves downwardly and clamps the needle 2 of the instrument 1 against the stop 3. Thus, the carrier 6 comes to a halt in a position which is a function of scene brightness because the control switch 21 connects the photoelectric cell 22 in circuit with the instrument 1 and causes the needle 2 to assume a position which is function of the intensity of scene light. While the carrier 6 moves downwardly, the bifurcated end portion 26 of its arm 25 turns the diaphragm adjusting lever 28 by way of the post 27 in the direction indicated by arrow $b$. The post 30 changes the angular position of the movable vane 33 so that the vanes 33, 34 define an aperture whose size is a function of scene brightness. The direction in which the vane 33 is moved from an end position corresponding to a maximum aperture size is indicated by arrow $c$.

When the lever 28 turns in the direction indicated by arrow $b$, its pin 54 shifts the shutter adjusting link 36 with reference to the pin 38 because the latter is held in illustrated position by spring 41 which biases the lever 39 to the first end position in which the lever 39 abuts against the stop 42. The direction in which the link 36 is shifted by pin 54 of the lever 28 is indicated by arrow $d$. The spring 49 biases the follower 46 against the face of the cam 45 which latter shares the movement of the link 36 in the direction indicated by arrow $d$ whereby the cam 45 turns the lever 48 in the direction indicated by arrow $e$. The post 50 of the lever 48 changes the position of the flywheel 53 which results in appropriate setting of the retard mechanism to adjust the shutter as a function of scene brightness.

The lever 28 comes to a halt when the stepped edge face of the scanner 4 moves the needle 2 into abutment with the stop 3. The link 36 is also arrested so that the diaphragm and the shutter are properly adjusted in dependency on prevailing scene brightness. The operator continues to depress the release 10 in the direction of arrow $a$ whereby the latter releases the shutter in a manner well known from the art and the shutter permits scene light to reach an unexposed film frame through the aperture defined by vanes 33, 34 and for a period of time determined by setting of the retard mechanism 46–52.

If the operator wishes to make an exposure in artificial light, the plug 13$a$ of the multiple flash bulb holder 13 is inserted into the recess of the socket 12 so that the plug 13$a$ displaces the resetting rod 16 against the opposition of the spring 17. The direction of such displacement of the rod 16 is indicated by the arrow $f$. The arm 44 of the rod 16 bears against the post 43 and pivots the lever 39 in the direction indicated by arrow $g$ whereby the lever 39 assumes a second end position and the spring 41 stores energy. The pin 38 of the lever 39 causes the link 36 to pivot on the pin 54 of the lever 28 in the direction indicated by arrow $h$ so that the cam 45 on the link 36 allows the spring 49 to adjust the retard mechanism in order to select an exposure time which is best suited for exposures with light furnished by a flash bulb 13$b$. The spring 49 moves the lever 48 to an end position determined by the lower end 55$a$ of a guide slot 55 machined into the plate P. This slot 55 receives a portion of the follower 46. By way of example, the exposure time which is set by the retard mechanism 46–52 when the plug 13$a$ is attached to the socket 12 so that the follower 46 extends into the end 55$a$ of the guide slot 55 can be 1/30 of a second.

When the resetting rod 16 moves downwardly in response to insertion of the plug 13$a$ into the recess of the socket 12, the trip 20 of the collar 19 moves the central contact 21$a$ of the control switch 21 into engagement with the fixed contact 21$c$ so that the photoelectric cell 22 is disconnected from the instrument 1 and is replaced by the variable resistor 23 and battery 24. The position of the needle 2 is then a function of the resistance of the resistor 23, and such resistance is dependent on the setting of the focussing means, i.e. on the distance between the objective lens 35 and the scene or subject. In order to account for the sensitivity of film which is used for exposures in artificial light, the entire housing of the instrument 1 can be turned or otherwise adjusted. Alternatively, such sensitivity can be accounted for by providing in the circuit of the instrument 1, resistor 23 and battery 24 a second variable resistor (not shown) which is adjustable as a function of film sensitivity. This second variable resistor can be mounted in such a way that it is in circuit with the instrument 1 irrespective of the position of control switch 21, i.e., regardless of whether the instrument 1 is connected with the cell 22 or with the resistor 23 and battery 24. Such mounting of the second resistor renders it possible to adjust the exposure meter assembly when the user employs two or more types of daylight film.

In order to make an exposure with flash, the operator thereupon depresses the shutter release 10 (arrow $a$) whereby the spring 7 entrains the scanner 4 and moves it against the needle 2 which is clamped against the stop 3 in a position which is a function of the distance from the subject or scene because the trip 20 connects the battery 24 and resistor 23 in circuit with the instrument 1. The arm 25 of the carrier 6 causes the diaphragm adjusting lever 28 to turn in the direction indicated by arrow $b$ and the lever 28 adjusts the position of the movable vane 33 (arrow $c$). However, the lever 28 cannot adjust the shutter because, when it turns in the direction indicated by arrow $b$, it moves the cam 45 on the link 36 away from the follower 46 which is held by spring 49 in the lower end 55$a$ of the guide slot 55. Thus, the lever 28 then influences only the diaphragm by selecting an appropriate aperture size but the setting of the shutter remains unchanged, such setting having been determined by the arm 44 of the resetting rod 16 in response to attachment of the plug 13$a$ to the socket 12. The exposure is made in response to further depression of the shutter release 10.

The various springs automatically return all parts to starting or idle positions in response to termination of pressure against the upper end portion of the shutter release 10. It will be noted that the camera of FIG. 1 comprises a relatively small number of springs.

Figure 2:
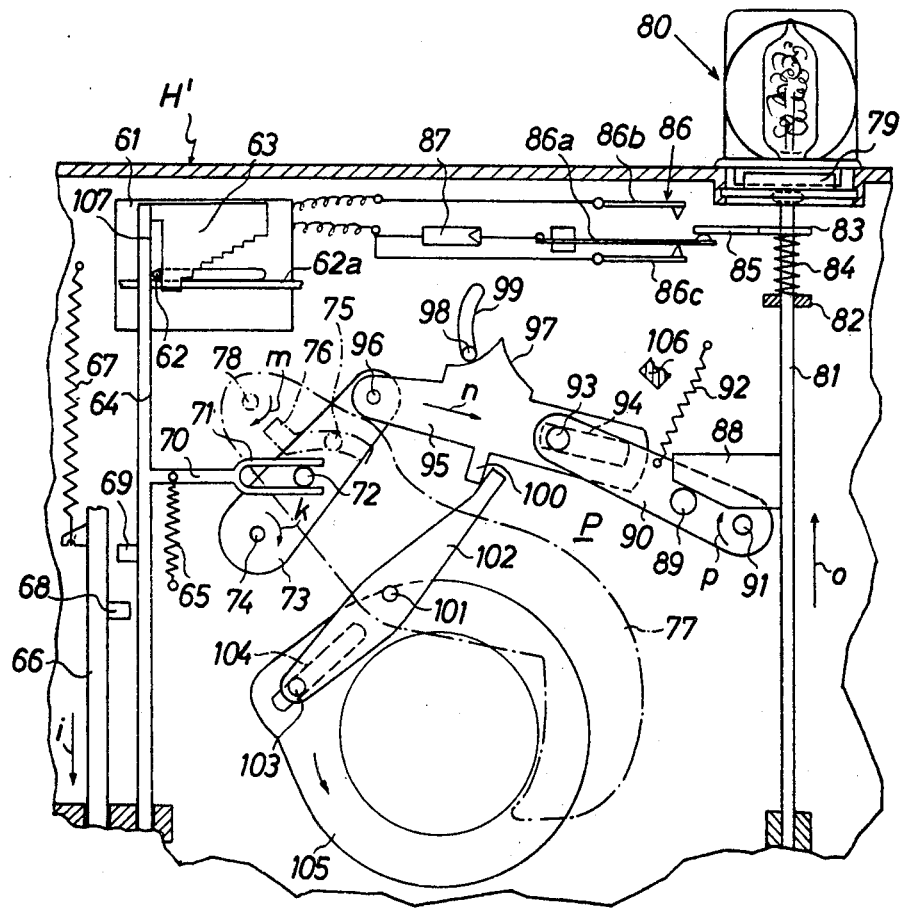
FIG. 2 is a similar fragmentary sectional view of a modified camera.

The camera which is shown in FIG. 2 is somewhat different from the camera of FIG. 1 because it comprises a mechanical coupling between the diaphragm and the focussing means when it is set for operation in artificial light. The housing H' accommodates an exposure meter assembly which includes a moving coil instrument 61 having an output member or needle 62 whose position can be detected by the stepped edge face of a scanner 63. The latter is affixed to the upper end portion of a rod-like motion transmitting member or carrier 64 which is biased downwardly by a helical spring 65. A shutter release 66 is reciprocable in the housing H' and comprises a projection or lug 68 which can cooperate with a lug or projection 69 on the carrier 64 to return the latter to an upper end position above the position shown in FIG. 2. The shutter release 66 is biased upwardly by a strong return spring 67 and can be depressed downwardly (arrow i) in response to the application of finger pressure or by a cable release, not shown. When the shutter release 66 moves downwardly, the spring 65 contracts and moves the carrier 64 and scanner 63 downwardly whereby the stepped edge face of the scanner presses the needle 62 against a fixed back support or stop 62a in the same way as described in connection with FIG. 1.

The carrier 64 comprises an extension or arm 70 having a bifurcated end portion 71 whose prongs straddle a post or pin 72 on a diaphragm adjusting lever 73 which is turnable on a fixed pivot pin 74. A post 75 of the lever 73 extends into an arcuate slot 76 machined into a movable diaphragm blade or vane 77 which is turnable on a fixed pivot pin 78.

The built-in illuminating arrangment of the camera shown in FIG. 2 comprises an indexible socket 79 adapted to receive and to turn the plug of a multiple flash bulb holder 80 corresponding to the "Flashcube" 13 shown in FIG. 1. The plug is shown in inserted position so that it holds a resetting rod 81 in an operative position and causes a spring 84 to store energy. The spring 84 operates between a collar or flange 83 of the resetting rod 81 and a bearing 82 provided in the housing H'. An extension or trip 85 of the collar 83 serves to move a central contact 86a forming part of a two-way control switch 86. The central contact 86a tends to engage the fixed upper contact 86b of the control switch so as to connect the instrument 61 in circuit when a photoelectric cell 87. When the plug of the multiple flash bulb holder 80 is inserted into the socket 79, the trip 85 maintains the central contact 86a in engagement with the fixed lower contact 86c of the control switch 86 so that the instrument 61 is disconnected from the photoelectric cell 87. The latter is shorted and the needle 62 of the instrument 61 assumes an end position which is shown in FIG. 2.

The resetting rod 81 is further provided with a motion transmitting extension or arm 88 which bears against a post 89 provided on a lever 90 which is turnable on a fixed pivot pin 91. When the rod 81 is depressed by the plug of the multiple flash bulb holder 80, the extension 83 maintains the lever 90 in the illustrated lower end position. The lever 90 is biased by a helical spring 92 which tends to turn it in a clockwise direction and to maintain the post 89 in engagement with the extension 88. A pivot 93 of the lever 90 extends into an elongated slot 94 provided in a link 95 which serves to adjust the shutter. This link 95 is turnable on a pivot pin 96 provided on the lever 73. A cam 97 on the link 95 cooperates with a follower 98 which is guided in an arcuate guide slot 99 and forms part of a delay or retard mechanism in the shutter, not shown. The downward movement of the follower 98 is limited by the internal surface at the lower end of the guide slot 99.

The link 95 is further provided with a projection or lug 100 which can cooperate with one arm of a two-armed arresting lever 102. The latter is pivotable on a fixed pin 101 and its other arm carries a post or stud 103 extending into an elongated slot 104 of a rotary focussing member 105. This focussing member 105 is turnable about the optical axis. The parts 100–105 together form an adjusting device which can adjust the diaphragm by way of link 96 and lever 73 as a function of the distance from the subject when the camera is set for operation in artificial light.

In order to make an exposure with flash, the operator attaches the multiple flash bulb holder 80 to the socket 79 so that a fresh flash bulb faces the subject or scene. The trip 85 then disconnects the photoelectric cell 87 from the instrument 61 and the extension 88 of the resetting rod 81 moves the lever 90 by way of the post 89 so that the lever 90 moves away from a fixed stop 106 to assume a lower end position and to stress the spring 92. In the next step, the operator depresses the shutter release 66 in the direction indicated by arrow i and enables the spring 65 to contract so as to move the carrier 64 downwardly in the same direction. The carrier 64 causes its arm 70 to turn the lever 73 in the direction indicated by arrow k. Such pivotal movement of the lever 73 is terminated when the lug 100 of the link 95 strikes against the upper arm of the arresting lever 102. Thus, the lever 102 then stops the link 95, the lever 73 and the carrier 64. The scanner 63 has a recess or slit 107 which accommodates the needle 62 in the illustrated end position. As stated before, the needle 62 assumes such end position when the instrument 61 is disconnected from the photoelectric cell 87 in response to downward movement of the resetting rod 81. The scanner 63 then holds the needle 62 against movement from the end position. While the lever 73 pivots in response to downward movement of the arm 70 on the carrier 64, its post 75 travels in the slot 76 and turns the movable vane 77 about the pivot pin 78 in the direction indicated by arrow m. The aperture defined by the blade 77 is a function of the angular position of the arresting lever 102, i.e., it depends on the setting of the focussing member 105. The focussing member is preferably adjusted in advance so that the size of the aperture defined by the vane 77 is a function of the distance from the subject.

When the multiple flash bulb holder 80 is attached to the socket 79, the lever 90 maintains the link 95 in an initial position in which the follower 98 is free to remain in the lower end of the guide slot 99 as soon as the shutter release 66 is depressed sufficiently to permit movement of the lever 73 to the position shown in FIG. 2. Therefore, the link 95 influences the exposure time which is determined automatically due to the fact that the follower 98 of the retard mechanism of the shutter dwells in the lower end of the slot 99. The direction in which the link 95 moves in response to clockwise rotation of the lever 73 is indicated by the arrow n.

If the operator detaches the multiple flash bulb holder 80 from the socket 79, the camera is ready for exposures in daylight. The spring 84 returns the resetting rod 81 to idle position (arrow o) and the trip 85 permits the central contact 86a of the control switch 86 to engage the upper fixed contact 86b so that the instrument 61 is connected in circuit with the photoelectric cell 87. Since the spring 67 holds the shutter release 66 in the upper end position in which the lug 68 cooperates with the lug 69 to maintain the carrier 64 in the upper end position, the slit 107 of the scanner 63 is located at a level above the needle 62 so that the latter can assume a position which is a function of scene brightness. When the resetting rod 81 moves upwardly, the spring 92 contracts and turns the lever 90 in a clockwise direction (arrow p) so that the lever 90 returns into abutment with the stop 106. Thus, the components 73, 95, 90 of the crank chain are compelled to assume positions similar to those of the components 28, 36, 39 in FIG. 1.

The operator then depresses the shutter release 66 in the direction indicated by arrow i. The exposure is made in the same way as described in connection with FIG. 1, i.e., the spring 65 moves the carrier 64 downwardly and the stepped edge face of the scanner 63 engages the needle 62 and presses it against the back support 62a. This arrests the lever 73 in an angular position which is a function of scene brightness and the lever 73 adjusts the vane 77 in dependency on such scene brightness. The link 95 is moved in the direction indicated by arrow $n$ and causes its cam 97 to adjust the position of the follower 98 so that the retard mechanism of the shutter is also adjusted as a function of scene brightness. The right-hand end portion of the link 95 is then located at a level above that shown in FIG. 2 because the lever 90 abuts against the stop 106 so that the cam 97 can displace the follower 98 from the end position shown in FIG. 2 to the extent depending on the intensity of scene light. Also, the lug 100 of the link 95 is then free to bypass the upper arm of the arresting lever 102 so that the exposure time can be selected independently of the position of the focussing member 105.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a photographic camera for operation in daylight and artificial light, a combination comprising an adjustable shutter mechanism; an adjustable diaphragm mechanism; an illuminating arrangement including resetting means movable between idle and operative positions to respectively set the camera for operation in daylight and artificial light; a crank chain comprising movable first and second components respectively arranged to adjust said diaphragm mechanism and said shutter mechanism and a movable third component arranged to move said second component with reference to said first component in response to movement of said resetting means between said positions thereof; a photosensitive exposure meter assembly for initiating adjustment of said mechanism by way of said first component as a function of scene brightness when the camera is set for operation in daylight; and adjusting means for influencing the adjustment of said diaphragm mechanism by way of said first component as a function of the distance from the subject when the camera is set for operation in artificial light.

2. A combination as defined in claim 1, wherein said crank chain further comprises pivot means articulately connecting said first and second components and a pin-and-slot connection between said second and third components.

3. A combination as defined in claim 1, wherein said third component is movable between first and second end positions and further comprising means for biasing said third component to one of said end positions, said resetting means being arranged to effect movement of said third component from said one end position to the other end position in response to movement to operative position.

4. A combination as defined in claim 1, wherein said illuminating arrangement further comprises socket means and a male element detachably connectable with said socket means, said resetting means comprising a member which normally extends into said socket means in the idle position thereof and is expelled from said socket means to assume said operative position in response to attachment of said male element to said socket means.

5. A combination as defined in claim 4, wherein said male element is the plug of a multiple flash bulb holder and wherein said member of said resetting means is reciprocable in the housing of the camera between said idle and operative positions thereof.

6. A combination as defined in claim 1, wherein said second component comprises cam means and said shutter mechanism comprises follower means arranged to track said cam means in the idle position of said resetting means.

7. A combination as defined in claim 6, wherein said shutter mechanism further comprises means for biasing said follower means to an end position and wherein said follower means is free to assume said end position in response to movement of said resetting means to operative position whereby said follower means determines the exposure time for exposures with artificial illumination of the subject.

8. A combination as defined in claim 7, wherein said shutter mechanism comprises a delay unit and said follower means and said biasing means form part of said delay unit.

9. A combination as defined in claim 1, wherein said diaphragm mechanism comprises at least one vane movable between plural positions each of which corresponds to a different aperture size and further comprising a pin-and-slot connection between said vane and said first component.

10. A combination as defined in claim 1, wherein said diaphragm mechanism comprises at least one vane movable between a plurality of positions each of which corresponds to a different aperture size and further comprising a cam-and-follower connection between said first component and said vane.

11. A combination as defined in claim 1, wherein said exposure meter assembly comprises a photosensitive element exposed to scene light, an output member positionable as a function of scene brightness, scanner means for detecting the position of said output member, and means for moving said first component as a function of the position of said scanner means.

12. A combination as defined in claim 1, wherein said exposure meter assembly comprises a moving coil instrument, variable resistor means, a photosensitive element exposed to scene light, and control means for respectively connecting said instrument means in circuit with said photosensitive element and said resistor means when the camera is respectively set for operation in daylight and artificial light.

13. A combination as defined in claim 12, wherein said instrument comprises a movable output member whose position is a function of scene brightness when said instrument is in circuit with said photosensitive element, and scanner means arranged to detect the position of said output member and to adjust said first component as a function of scene brightness.

14. A combination as defined in claim 12, wherein said adjusting means comprises means for adjusting the resistance of said resistor means as a function of the distance from the subject.

15. A combination as defined in claim 1, wherein said adjusting means comprises focussing means for determining the position of said second component as a function of the distance from the subject in operative position of said resetting means.

16. A combination as defined in claim 15, wherein said adjusting means further comprises arresting means movable by said focussing means and operative to arrest said second component in a position in which said shutter mechanism provides a predetermined exposure time for operation in artificial light in operative position of said resetting means.

17. A combination as defined in claim 16, wherein said arresting means comprises a two-armed lever having one arm cooperating with said focussing means and another arm cooperating with a projection of said second component in operative position of said resetting means.

18. A combination as defined in claim 17, further comprising a pin-and-slot connection between said one arm of said lever and said focussing means.

19. A combination as defined in claim 18, wherein said lever is turnable about a fixed axis and said focussing means is rotatable about the optical axis of the camera.

20. A combination as defined in claim 1, wherein said crank chain is a quadric crank chain which further comprises a stationary fourth component, said first and third components being pivotable with reference to said fourth component about two parallel pivot axes and said second component being pivotable with reference to said first component about a third axis which is parallel with said first and second axes, said crank chain further comprising a pin-and-slot connection between said second and third components.

References Cited

UNITED STATES PATENTS

| | | |
|---|---|---|
| 3,072,028 | 1/1963 | Lange. |
| 3,204,541 | 9/1965 | Frost et al. _____ 95—11.5 XR |
| 3,283,681 | 11/1966 | Singer et al. |
| 3,285,149 | 11/1966 | Fahlenberg et al. |
| 3,406,619 | 10/1968 | Rentschler. |
| 3,434,404 | 3/1969 | Kobayashi et al. |

JOHN M. HORAN, Primary Examiner

J. F. PETERS, JR., Assistant Examiner

U.S. Cl. X.R.

95—53, 64